United States Patent [19]

Hieda et al.

[11] Patent Number: 4,931,856
[45] Date of Patent: Jun. 5, 1990

[54] IMAGE SENSING APPARATUS

[75] Inventors: Teruo Hieda; Masao Suzuki; Hitoshi Narita, all of Kanagawa, Japan

[73] Assignee: Canon Kabushiki Kaisha, Tokyo, Japan

[21] Appl. No.: 311,434

[22] Filed: Feb. 16, 1989

Related U.S. Application Data

[63] Continuation of Ser. No. 175,670, Mar. 21, 1988, abandoned, which is a continuation of Ser. No. 80,253, Jul. 27, 1987, abandoned, which is a continuation of Ser. No. 686,712, Dec. 27, 1984, abandoned.

[30] Foreign Application Priority Data

Dec. 28, 1983 [JP] Japan ................................ 58-245909

[51] Int. Cl.⁵ ......................... H04N 9/07; H04N 9/73
[52] U.S. Cl. ........................................ 358/29; 358/44
[58] Field of Search ................ 358/27, 29, 29 C, 41, 358/43, 44, 55

[56] References Cited

U.S. PATENT DOCUMENTS

| | | | |
|---|---|---|---|
| 4,274,107 | 6/1981 | Tamura et al. | 358/29 C |
| 4,395,730 | 7/1983 | Shen | 358/29 C |
| 4,506,290 | 3/1985 | Hashimoto | 358/29 C |
| 4,562,459 | 12/1985 | Sokei | 358/29 |
| 4,574,303 | 3/1986 | Hashimoto et al. | 358/29 C |
| 4,584,598 | 4/1986 | Kutaragi | 358/29 C |
| 4,605,955 | 8/1986 | Hashimoto et al. | 358/29 C |
| 4,616,253 | 10/1986 | Hashimoto et al. | 358/29 C |
| 4,679,099 | 7/1987 | Edakubo | 360/10.2 |

FOREIGN PATENT DOCUMENTS

| | | | |
|---|---|---|---|
| 56-4993 | 1/1981 | Japan | 358/29 |
| 2079092 | 1/1982 | United Kingdom | 358/27 |

Primary Examiner—James J. Groody
Assistant Examiner—Robert M. Bauer
Attorney, Agent, or Firm—Toren, McGeady & Associates

[57] ABSTRACT

The image sensing apparatus includes a first circuit for forming a signal to control the gains of the various color signals included in the outputs of a image sensing device in accordance with the amplitudes of the color-difference signals of the various color signals, a second circuit for forming a signal to control the gains of the various color signals in accordance with the color temperature of an object to be photographed, and a gain control circuit for controlling and determining the gains of the various color signals in response to a combined output of the signals formed by the first and second circuits.

31 Claims, 7 Drawing Sheets

IMAGE SENSING APPARATUS

This is a continuation application of Ser. No. 175,670, filed Mar. 21, 1988, which in turn is a continuation application of Ser. No. 080,253, filed Jul. 27, 1987, which in turn is a continuation application of Ser. No. 686,712, filed Dec. 27, 1984 now abandoned.

BACKGROUND OF THE INVENTION:

1. Field of the Invention:

The present invention relates to a color image sensing apparatus having an improved automatic white balance adjustment device.

2. Description of the Prior Art:

In color television cameras, particularly, portable television cameras for home use, the small-sized, lightweight and high-performance cameras have been developed based on the recent advance of electric circuit technology. Particularly, according to the realization of non-adjustment of a circuit and automation of operation, color television cameras with which any person having no special knowledge can easily take a photograph, have been manufactured and have come into wide use.

The most popular error in photography by such a color television camera is color adjustment failure particularly, white balance adjustment. Unless a color television camera is adjusted in such a way that when a white object is photographed the ratio of components of the three primary colors, that is, red (R), green (G) and blue (B), which are contained in an output television signal, is 1:1:1, the quality of color-reproduction of an image to be reproduced on a television screen is decreased. Therefore, white balance adjustment for adjusting color signal gains in accordance with illuminating light at a place to be photographed prior to photography is necessary. Heretofore, the white balance adjustment was effected such that an operator directly adjusted a circuit constant or an optical filter by using a monitor television or a waveform monitor or the like. Recently, automatic adjustment, the so-called automatic white balance adjustment, has been effected. However, in the conventional automatic white balance adjustment, there are large errors in some conditions of use and the possiblility of erroneous operation. When an average person effects the adjustment, a satisfactory picture cannot be obtained in many cases. The particular drawbacks are as follows:

(1) An operator is apt to forget to set white balance adjustment.

(2) A large error occurs unless white balance adjustment is set for a white object.

(3) When the illumination condition changes after setting, white balance adjustment does not follow unless resetting is effected.

SUMMARY OF THE INVENTION

It is an object of the present invention to eliminate the above drawbacks of the prior art and to provide an image sensing apparatus in which an operator is able to easily adjust white balance with high accuracy and without erroneous operation.

It is another object of the present invention to provide an image sensing apparatus capable of highly accurate white balance adjustment and capable of following the variation of color temperature.

It is a further object of the present invention to provide an image sensing apparatus capable of white balance adjustment having little error based on the variation of conditions of the object to be photographed.

Other objects and features of the present invention will become apparent from the following detailed description of the preferred embodiments thereof with reference to the accompanying drawings.

To attain the above objects, according to an embodiment of the present invention, an image sensing apparatus includes a first circuit for forming a signal to control the gains of the various color signals included in the outputs of an image sensing device in accordance with the levels of the various color signals, a second circuit for forming a signal to control the gains of the various color signals in accordance with the color temperature of an object to be photographed, and a gain control circuit for controlling and determining the gains of the various color signals in response to a combined output of the signals formed by the first and second circuits. In this image sensing apparatus, high quality color-reproduction can be performed with a simple operation, and white balance adjustment error increases only a little even if a photographic condition changes. Furthermore, according to another embodiment of the present invention, the image sensing apparatus also includes a microcomputer for controlling the combined output of the signals of the first and second circuits. Therefore, an operator can take a photograph in the best condition even if he erroneously operates the apparatus. Accordingly, a handy color television camera in which failure rarely occurs can be constructed.

Figure 1:
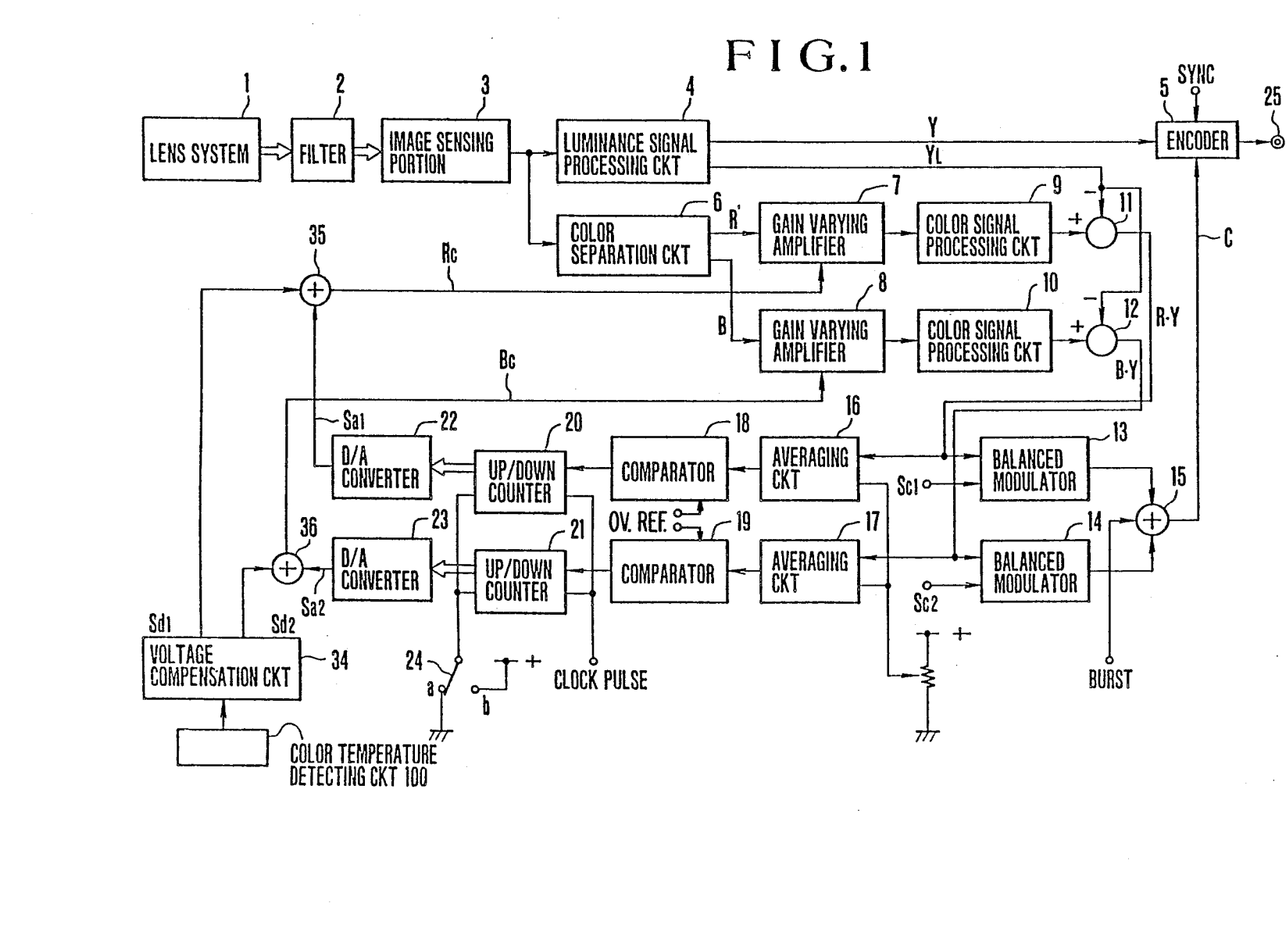
FIG. 1 is a circuit block diagram of a color image sensing apparatus in which an automatic white balance adjustment device is used in accordance with a preferred embodiment of the present invention.

DETAILED DESCRIPTION OF THE PREFERRED EMBODIMENTS:

FIG. 1 shows a first embodiment of a color image sensing apparatus according to the present invention. In FIG. 1, the color image sensing apparatus includes a photographic lens system 1, a color temperature converting optical filter 2, an image sensing portion 3 having an image sensing tube and a preamplifier and operating as an image sensing means for converting an optical image into an electrical picture signal, a luminance signal processing circuit 4 for processing a luminance signal Y, a television signal encoder 5, a color separation circuit 6 for separating a red signal R and a blue signal B, and gain varying amplifiers 7 and 8 operating as gain control means for varying and controlling gains of the signals R and B, respectively. The color image sensing apparatus also includes color signal processing circuits 9 and 10 for processing the signals R and B, respectively, subtracter circuits 11 and 12 for forming a difference signal R-Y of teh signals R and Y and a difference signal B-Y of the signals B and Y, respectively, balanced modulators 13 and 14 for balance-modulating the signals R-Y and B-Y, respectively, an adder circuit 15, averaging circuits 16 and 17 for detecting mean values of the signals R-Y and B-Y, respectively, comparators 18 and 19 operating as distinction means for comparing the mean values of the signals R-Y and B-Y with a reference zero level, respectively, up/down counters 20 and 21, D/A converters 22 and 23 for generating voltages to vary the gains of the signals R and B, respectively, an automatic white balance setting switch 24, a picture signal output terminal 25, a voltage compensation circuit 34 operating as compensation means, a color temperature detecting circuit 100, and adder circuits 35 and 36.

An optical image which has passed through the lens system 1 is converted into color temperature by the optical filter 2 and is further converted into an electrical signal by the image sensing portion 3. A luminance component of the electrical signal is processed by the luminance signal processing circuit 4 to become the luminance signal Y and a low band luminance signal $Y_L$. On the other hand, a color component of the electrical signal is separated into the red signal R and the blue signal B by the color separation circuit 6. The signals R and B, which have passed through the gain varying amplifiers 7 and 8, are processed by the color signal processing circuits 9 and 10 and are subject to subtraction of the low band luminance signal $Y_L$ to become the color-difference signals R-Y and B-Y, respectively. The signal R-Y and B-Y are balance-modulated with sub-carriers SC1 and SC2 by the balanced modulators 13 and 14, respectively, and are added up by the adder circuit 15 to become a chrominance signal C. The chrominance signal C is combined with the luminance signal Y to become a picture signal.

Furthermore, the color-difference signals R-Y and B-Y are averaged by the averaging circuits 16 and 17 and are compared with the zero level by the comparators 18 and 19, respectively.

When a white balance button (not shown) is depressed with the apparatus turned toward a white object, the automatic white balance setting switch 24 is connected to a terminal "a" to enable the up/down counters 20 and 21 to operate. The up/down counters 20 and 21 count clock pulses in such a way that "up" and "down" are controlled in accordance with "high" and "low" outputs of the comparators 18 and 19. The outputs of the up/down counters 20 and 21 are converted into analog voltages by the D/A converters 22 and 23. The analog voltages are supplied to the adder circuits 35 and 36 to control gains produced by the gain varying amplifiers 7 and 8, respectively. An automatic white balance adjustment device of the present invention is essentially composed of a closed loop circuit including the gain varying amplifiers 7 and 8 through the D/A converters 22 and 23, and operates in such a way that the mean values of the color-difference signals R-Y and B-Y become zero. Therefore, the automatic white balance adjustment device is set such that the chrominance signal C is extinguished and the white object is seen on a display as being actually white condition.

On the other hand, the voltage compensation circuit 34 operating as compensation means is controlled on the basis of data detected by the color temperature detecting circuit 100 operating as detection means for detecting a state of the object to be photographed, such as color temperature, luminance, etc. The voltage compensation circuit 34 forms a compensation signal Sd1 for the signal R-Y and a compensation signal Sd2 for the signal B-Y. The compensation signals Sd1 and Sd2 are added to outputs Sa1 and Sa2 of the D/A converters 22 and 23 by the adder circuits 35 and 36, to become total gain control signals Rc and Bc, respectively.

In the up/down counters 20 and 21, the gain control signals Rc and Bc for controlling gains to be produced by the amplifiers 7 and 8 at the time of a predetermined color temperature T0 are preset.

It is noted that the image sensing means may be a solid-state image sensor.

Figure 2:
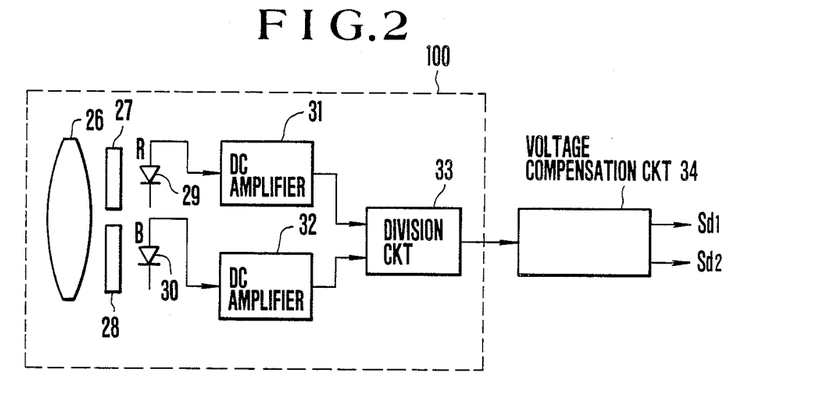
FIG. 2 is a circuit block diagram of parts of the color image sensing apparatus of FIG. 1.

FIG. 2 shows an example of the construction of the color temperature detecting circuit 100 of FIG. 1. The detecting circuit 100 includes a lens 26 for receiving ambient light, a red filter 27, a blue filter 28, photo-diodes 29 and 30, DC amplifiers 31 and 32, and an analog division circuit 33 for an operation of R/B. The voltage compensation circuit 34 generates compensation signals Sd1 and Sd2 to compensate for the gains in the R-channel and the B-channel of the picture signal. Ambient light, which has passed through the lens 26, is supplied to the photo-diodes 29 and 30 through the red filter 27 and the blue filter 28 to become voltages corresponding to red and blue components of the ambient light. These voltages are amplified by the DC amplifiers 31 and 32 and are divided by each other by the analog division circuit 33 to become the ratio between the blue component and the red component. In response to this ratio, the voltage compensation circuit 34 forms the compensation signals Sd1 and Sd2 to control the gain varying amplifiers 7 and 8.

Figure 3:
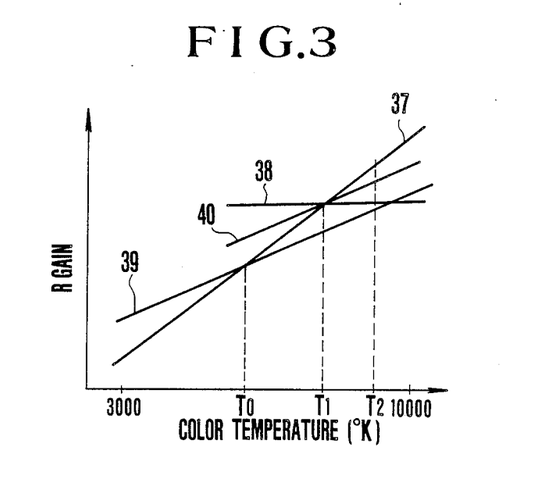
FIG. 3 is a diagram explaining the compensation characteristic for color temperature according to the present invention.

FIG. 3 shows the operation of the embodiment of the present invention. In FIG. 3, the vertical axis identifies a gain produced by the gain varying amplifier 7 for the signal R. The horizontal axis identifies color temperature. Reference numeral 37 identifies the optimum compensation curve, 38 identifies the gain compensation characteristic curve of the prior art in which the amplifiers 7 and 8 are controlled only by the signals Sa1 and Sa2, 39 identifies the gain compensation characteristic curve of the prior art in which the amplifiers 7 and 8 are controlled only by the signals Sd1 and Sd2, and 40 identifies the gain compensation characteristic curve of the present invention.

In the gain compensation characteristic curve 38 of the prior art, the compensation is accurate near a color temperature T1 at the time when the white balance is set. However, for example, when a color temperature of illuminating light changes from T1 to T2, the error increases unless the white balance is reset for the color temperature T2.

In the gain compensation characteristic curve 39 of the prior art, a error increases as the color temperature gets further away from the standard setting point T0.

In the gain compensation characteristic curve 40 of the present invention, compensation is extremely accurate near the color temperature T1 at the time when the white balance is set. Furthermore, even when a color temperature of illuminating light changes from T1 to T2, the error increases a little, since the detecting circuit 100 follows the change to compensate for the gains produced by the amplifiers 7 and 8. Furthermore, even if an operator forgets to set the white balance, the gains are compensated for by the use of the gain compensation characteristic curve 39, since the outputs of the up/down counters 20 and 21 are preset at the standard setting point T0. Accordingly, large errors can be prevented.

In the above, the gain compensation for the signal R has been described. An explanation of the gain compensation for the signal B is the same as above.

Figure 4:
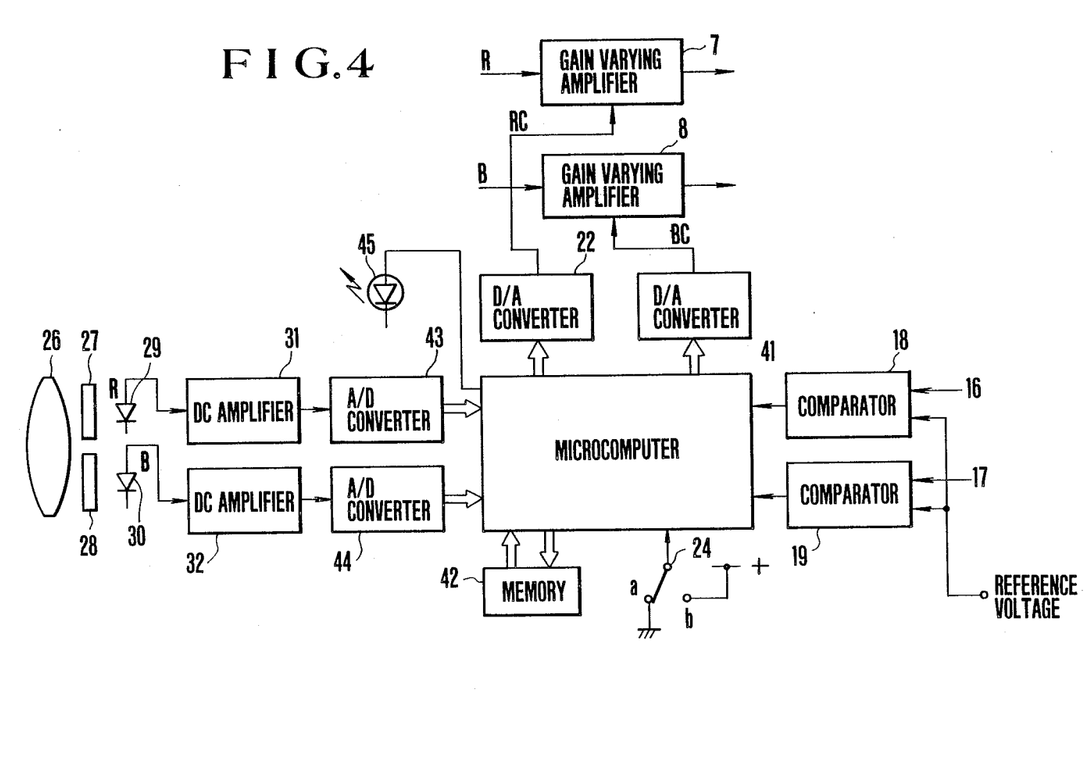
FIG. 4 is a circuit block diagram showing another embodiment of the present invention.

FIG. 4 shows a second embodiment of the present invention. In FIG. 4, outputs of the comparators 18 and 19, outputs of A/D converters 43 and 44, the automatic white balance setting switch 24, a memory 42, a warning light emitting diode 45, the D/A converters 22 and 23, etc. are connected to a microcomputer 41.

An example of the operation of the microcomputer 41 of FIG. 4 is described as follows with reference to the transfer diagram of FIG. 5.

The operation of the microcomputer 41 is divided into the following five modes:

(a) Mode 1 (standard setting state):
A mode in which the gains in the R- and B- channels are fixed to the set value corresponding to the standard color temperature T0. This set value is, for example, a value corresponding to a color temperature between 4000° K.–5000° K.

(b) Mode 2 (standard following state):
A mode in which the gains of the standard set value in mode 1 is compensated for in accordance with the outputs of the A/D converters 43 and 44.

(c) Mode 3 (setting state):
A mode in which the gains in the R- and B- channels are fixed to a value at the time of the last setting of the white balance which was effected by the switch 24, and are not compensated for by the detecting circuit 100.

(d) Mode 4 (set value following state):
A mode in which the value of the gains at the time of the setting of white balance in mode 3 is compensated for in accordance with the outputs of the A/D converters 43 and 44.

(e) Mode 5 (white balance setting operation):
A mode in which a white balance setting operation is effected that such the color-difference signals, R-Y, B-Y, become zero by connecting the white balance setting switch 24 to the terminal "a" and by varying the gains in the R- and B- channels during this time.

Figure 5:
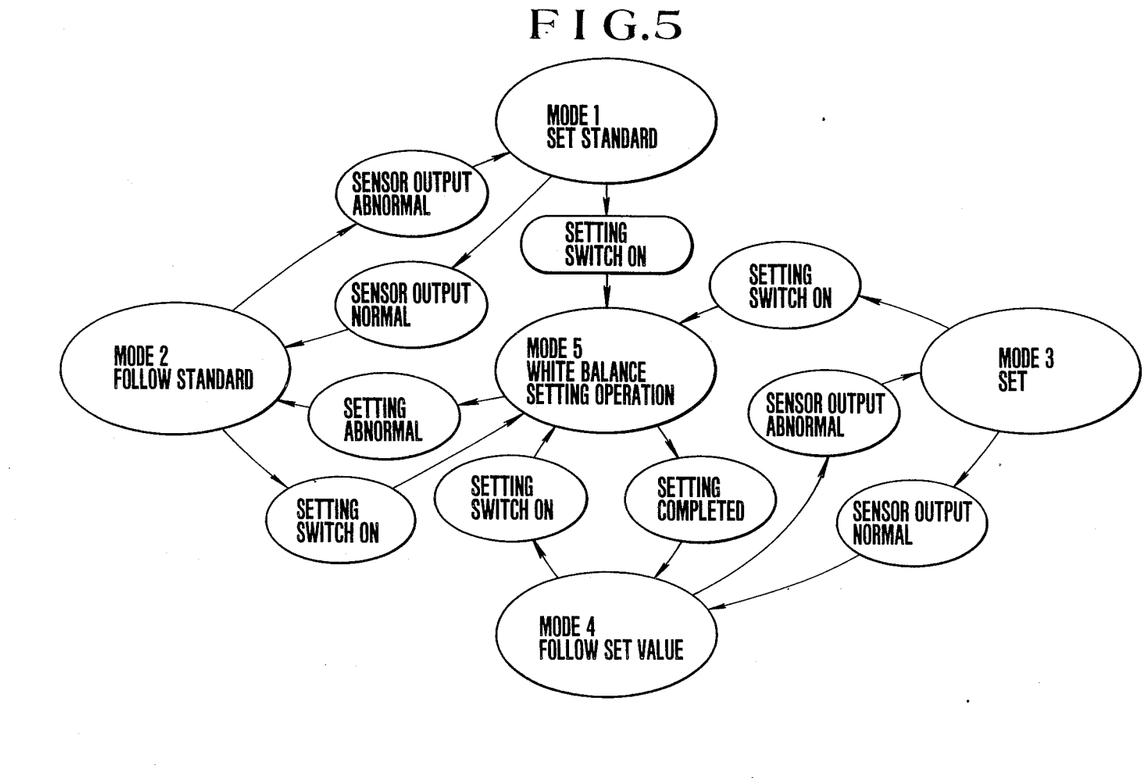
FIG. 5 is a diagram explaining the transfer of various modes in a microcomputer.
Figure 6A:
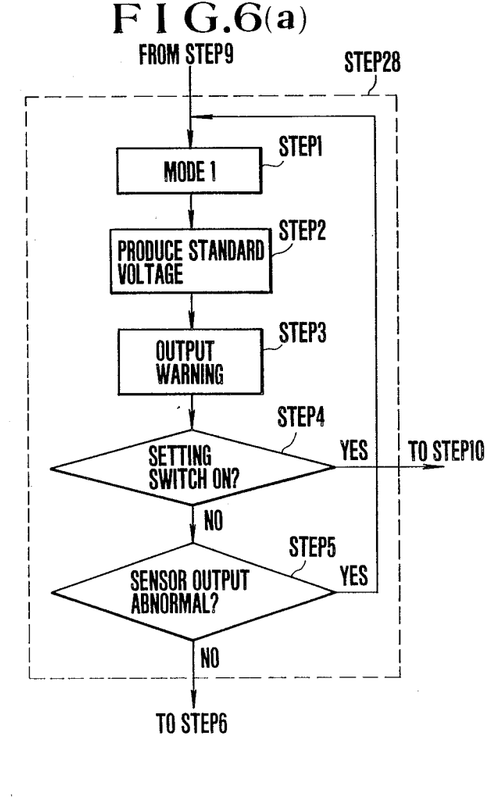
FIGS. 6(a) through 6(e) are flow charts illustrating processes of the various modes.
Figure 6B:
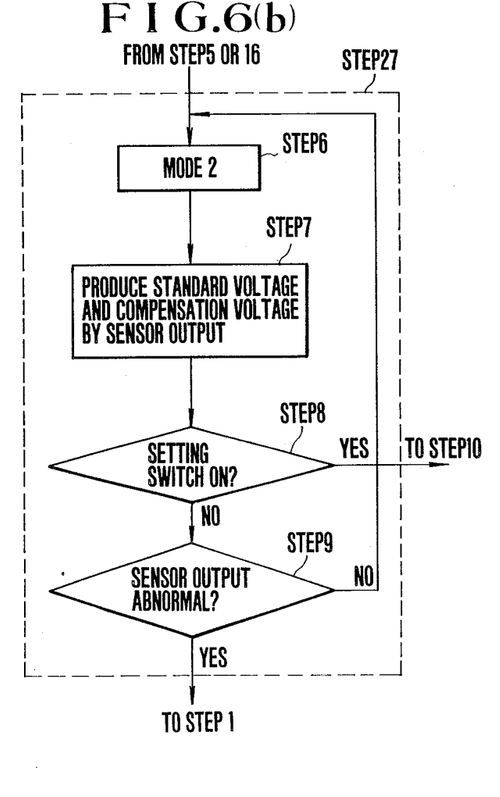
Figure 6C:
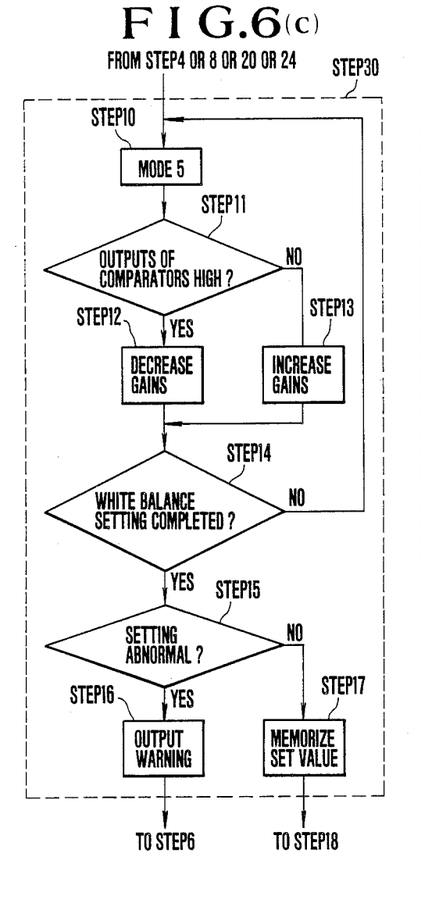
Figure 6D:
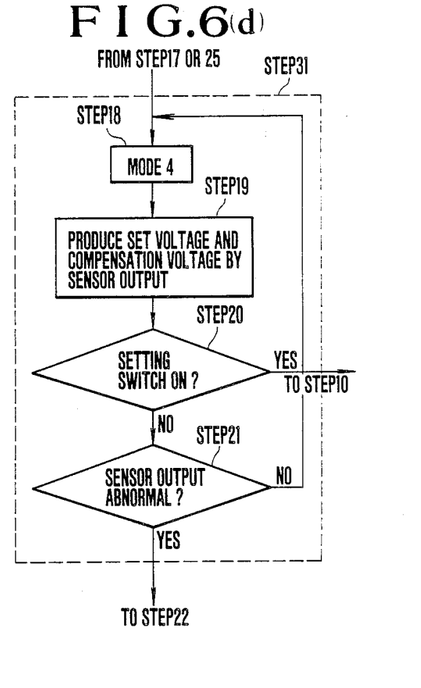
Figure 6E:
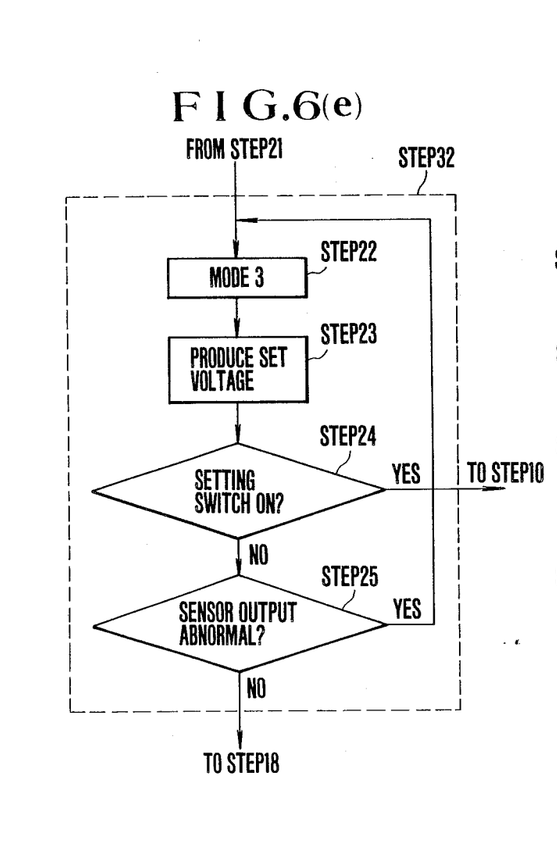

In FIG. 5, "sensor output abnormal" means the state in which the detecting circuit 100 does not normally detect light because of an eclipse of ambient light, such that at least one of the outputs of the photo-diodes 29 and 30 is lower than a predetermined value, or the ratio of two outputs is greater or less than a predetermined value.

"Setting abnormal" means the state in which the color-difference signals R-Y and B-Y cannot be adjusted to become zero within the varying range of the gains produced by the gain varying amplifiers 7 and 8.

"Setting completed" means the state in which a white balance setting is complete, that is, for example, outputs of the comparators 18 and 19 are inverted in accordance with changes of the lowest bits of the D/A converters 22 and 23, and the mean value of the color-difference signal R-Y, B-Y has become approximately zero.

An example of the operation is described in the following.

As shown in FIG. 5, the state of the white balance setting switch 24 and the abnormality or normality of the sensor 3 output are always watched. The operation of the microcomputer 41 shifts to another mode as soon as the state changes.

For example, when the white balance setting switch 24 is not closed, the operation is in mode 1 or 2. The modes 1 and 2 change to each other depending upon the abnormality and normality of the sensor 3 output. When the white balance setting switch 24 is closed, the operation shifts to mode 5 and the gains of the amplifiers 7 and 8 are controlled so that the mean value of the color-difference signals R-Y, B-Y about zero. When this control has been completed, the operation automatically shifts to mode 4 and the gains are compensated in accordance with the outputs of the color temperature detecting circuit 100. When the sensor 3 output is abnormal, the operation shifts to mode 3.

FIGS. 6(a) through 6(e) are flow charts showing a change of the operation between the modes 1 to 5. In the following, the operation is described in order of the step number thereof.

Step 1: The operation comes into mode 1.

Step 2: Standard voltages to control the gains of the amplifiers 7 and 8 so that the color-difference signals R-Y, B-Y become zero at the color temperature of 4500° K., are produced. In response to the standard voltages, the gains to be produced by the amplifiers 7 and 8 are controlled.

Step 3: The warning light emitting diode 45 is lit or turned on and off to represent the abnormality of the sensor 3 output.

Step 4: The decision is made: "is the white balance setting switch 24 closed?" If the answer is yes, the operation shifts to mode 5 and advances to step 10 (to be described later). If the answer is no, the operation advances to step 5.

Step 5: The decision is made: "is the sensor 3 output abnormal?" by comparing the ratio of the outputs of the photodiodes 29 and 30 or the output level of either photodiode with a predetermined value. If the answer to this is yes, the operation returns to step 1 and goes to mode 1. If the answer is no, the operation advances to step 6.

Step 6: The operation shifts to mode 2.

Step 7: The standard voltages are produced and added to the ouputs of the A/D converters 43 and 44 to become control signals. In response to the control signals, the gains of the amplifiers 7 and 8 are controlled.

Step 8: The decision is made: "is the white balance setting switch 24 closed?" If the answer to this is yes, the operation advances to step 10. If the answer is no, the operation advances to step 9.

Step 9: The decision is made: "is the sensor 3 output abnormal?" If the answer to this is no, the operation returns to step 6. If the answer is yes, the operation shifts to step 1.

Step 10: The operation shifts to mode 5.

Step 11: The decision is made: "are the outputs of the comparators 18 and 19 each at a high level?" If the answer is yes, the operation advances to step 12. If the answer is no, the operation shifts to step 13.

Step 12: The gain of the amplifier 7 or 8 is decreased.

Step 13: The gain of the amplifier 7 or 8 is increased.

Step 14: The decision is made: "has a white balance setting been completed?" If the answer is no, the operation returns to step 10. If the answer is yes, the operation advances to step 15.

Step 15: The decision is made: "is the setting abnormal?" If the answer is yes, that is, in a case where the color-difference signals R-Y, B-Y do not become zero even when the gains of the amplifiers 7 and 8 have been controlled as described above, the operation advances to step 16. If the answer is no, the operation advances to step 17.

Step 16: The warning light emitting diode 45 is lit or turned on and off to represent the abnormality. Then, the operation shifts to step 6.

Step 17: The set values are memorized by the memory 42, and then the operation advances to a step 18.

Step 18: The operation reaches mode 4.

Step 19: The set voltage values memorized by the memory 42 and the outputs of the A/D converters 43 and 44 are added up and then supplied to the D/A converters 22 and 23 to control the gains of the amplifiers 7 and 8, respectively.

Step 20: The decision is made: "is the white balance setting switch 24 closed?" If the answer is yes, the operation returns to step 10. If the answer is no, the operation advances to step 21.

Step 21: The decision is made: "is the sensor output abnormal?" If the answer is no, the operation returns to step 18. If the answer is yes, the operation shifts to step 22.

Step 22: The operation reaches mode 3.

Step 23: The microcomputer 41 produces the set voltage values memorized by the memory 42 to control the gains of the amplifiers 7 and 8 through the D/A converters 22 and 23.

Step 24: The decision is made: "is the white balance setting switch 24 newly closed?" If the answer is yes, the operation returns to step 10. If the answer is no, the operation shifts to step 25.

Step 25: The decision is made: "is the sensor output abnormal?" If the answer is yes, the operation returns to step 22. If the answer is no, the operation returns to step 18.

Figure 7:
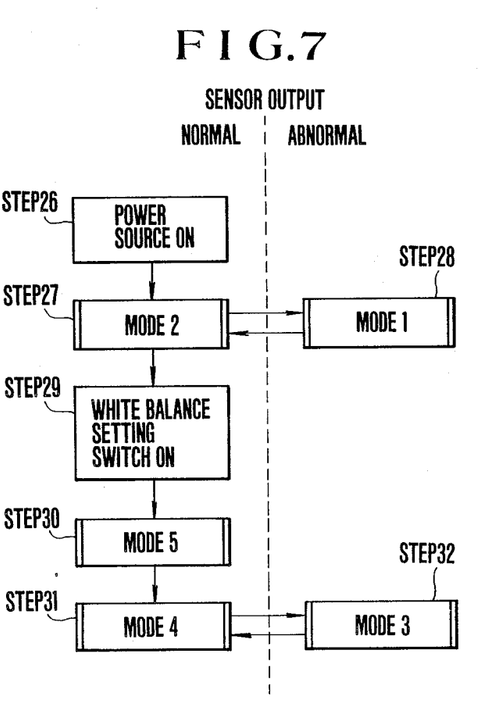
FIG. 7 is a flow chart illustrating operation of automatic white balance adjustment.

FIG. 7 shows an example of the actual operation of the automatic white balance adjustment when a general object is photographed. In this example, assume that the white balance setting is not abnormal.

When an electrical power switch is turned on (Step 26), the operation goes into a subroutine of mode 2 (Step 27). Depending upon the abnormality or normality of the sensor 3 output, the operation changes between the subroutine of mode 1 (Step 28) and the subroutine of mode 2. When the white balance setting switch 24 is closed (Step 29), the operation comes into the subroutine of mode 4 (Step 31) through the subroutine of mode 5 (Step 30). The white balance adjustment in the subroutine of mode 4 is most accurate. After that, the operation changes between the subroutine of mode 3 (Step 32) and the subroutine of mode 4.

The warning light emitting diode 45 is lit or turned on and off to warn an operator when abnormality of the sensor 3 output is detected in the subroutine of mode 1 or when the abnormality of the setting is detected in the subroutine of mode 5.

In the above embodiments of the present invention, when particularly high color-reproduction is not necessary, a photographer does not need to operate anything. If the white balance setting switch is depressed, a highly accurate white balance adjustment can be achieved. Furthermore, even if the illuminating light is changed, since the operation follows to compensate for the change, the error increases by a small amount. Furthermore, even if a photographer erroneously operates the camera, such as by covering the lens 26 erroneously, failure rarely occurs since the white balance adjustment is effected by a small error.

In the second embodiment, the microcomputer 41 is used. However, the whole or part of the microcomputer 41 may be replaced with a digital signal processing circuit having the same function.

Furthermore, a luminance signal level comparing output and an optical filter change detecting output may be supplied to the microcomputer. In this case, if a white balance setting is effected when the level of a luminance signal is lower than a predetermined value, and if an optical filter is changed to another after the white balance setting, a display for indicating a mode change or a display for warning is activated. In addition to this, the gains of the amplifiers 7 and 8 may be compensated. For example, when the luminance level of an object is lower than the predetermined value, the color temperature is also considered low. Therefore, the gains of the amplifiers 7 and 8 are controlled by use of a predetermined set value corresponding to the low color temperature of 3000° K.

Furthermore, although a mode is automatically changed, a mode change switch may be provided for a photographer to manually change the mode.

Furthermore, many displays for the various warning may be provided. The operation state or warning may be displayed with letters on an electronic view finder or a display panel using a character generator etc.

Furthermore, part of the digital processing system may be replaced with an analog operation circuit.

Furthermore, a change of modes may be effected not momentarily but for a predetermined time smoothly, so that a sudden change of picture quality can be prevented.

Furthermore, one or two modes may be omitted from the embodiment.

Furthermore, when the microcomputer is used, the memory 42 may be arranged to be energized even after the electrical power source is turned off, so that the operation can return to the last state when the electrical power source is turned on again.

As has been described above, in the color image sensing apparatus in which the automatic white balance adjustment device is used in accordance with the present invention, a high color-reproduction can be performed with a simple operation, and an error of white balance adjustment occurs only a little even if a photographic condition changes. Furthermore, when the microcomputer is used, an operator can take a photograph in the best condition even if he erroneously operates the apparatus. Accordingly, a handy color television camera in which a little failure occurs can be constructed.

What is claimed is:

1. A color image sensing apparatus comprising:
   (a) image sensing means for converting an optical image into an electrical picture signal having various color signal components;
   (b) distinction means for distinguishing color balance conditions of said various color signal components;
   (c) white balance control means responsive to an output of said distinction means for controlling white balance of said various color signal components;
   (d) light detection means other than said image sensing means for detecting a color temperature condition of an object image to be picked up and for generating an output signal corresponding to said color temperature; and (e) compensation means for generating a compensation output signal in response to the output of said light detection means for compensating said white balance of said various color signal components controlled by said white balance control means.

2. A color image sensing apparatus according to claim 1, wherein said distinction means distinguishes whether or not said various color signal components are in the same ratio.

3. A color image sensing apparatus according to claim 2, wherein said distinction means includes means for forming a color difference signal from the electrical picture signal of said image sensing means, and distinguishes whether the color-difference signal formed by said color difference signal forming means is zero or not.

4. A color image sensing apparatus according to claim 1, wherein said distinction means includes a counter changing the counting condition in response to the color balance condition of said various color signal components.

5. A color image sensing apparatus according to claim 1, wherein said white balance control means controls white balance of an R signal component and a B signal component of the electrical picture signal of said image sensing means.

6. A color image sensing apparatus according to claim 1, further comprising a switch for selectively causing said white balance control means, responsive to the output of said distinction means, to control said white balance.

7. A color image sensing apparatus according to claim 1, wherein said light detection means includes a plurality of sensors for detecting different colors.

8. A color image sensing apparatus according to claim 7, wherein said plurality of sensors includes a sensor for detecting R (red) color and a sensor for detecting B (blue) color.

9. A color image sensing apparatus according to claim 7, wherein said light detection means forms a signal corresponding to the ratio of the output levels of said plurality of sensors.

10. A color image sensing apparatus according to claim 1, further comprising mixing means for mixing the output of said compensation means and the output of said distinction means.

11. A color image sensing apparatus according to claim 10, wherein said mixing means includes an adder.

12. An image sensing apparatus comprising:
(a) color image sensing means for sensing an optical image to produce an output having various color signal components;
(b) setting means for setting a correlation between said various color signal components at a predetermined ratio in accordance with the output of said color image sensing means;
(c) light detecting means other than said color image sensing means for detecting color temperature; and
(d) compensation means for compensating said predetermined ratio in accordance with a color temperature condition of an object image to be picked up.

13. An image sensing apparatus according to claim 12, wherein said setting means sets the relative ratio of the various color signal components of the output of said color image sensing means at 1:1:1.

14. An image sensing apparatus according to claim 12, wherein said setting means sets relative gains of said various color signal components at a predetermined state.

15. An image sensing apparatus according to claim 12, wherein said compensation means compensates said predetermined ratio in accordance with a distribution of colors included in light from said object.

16. An image sensing apparatus according to claim 12, further comprising a switch for selectively operating said setting means.

17. An image sensing apparatus comprising:
(a) color image sensing means for sensing an optical image to produce an output having various color signal component, each having a respective signal level;
(b) first control means responsive to the levels of said various color signal components of the output of said color image sensing means for controlling gains of said various color signal components;
(c) light detection means separated from said color image sensing means for detecting a color temperature of an object to be photographed and producing an output signal, corresponding said color temperature of an object to be photographed;
(d) second control means responsive to the output of said light detection means for controlling said gains of said various color signal components of the output of said color image sensing means; and
(e) third control means for controlling said gains of said various color signal components by operating said first control means and said second control means in a predetermined combination.

18. An image sensing apparatus according to claim 17, further comprising a switch for selectively operating said first control means.

19. An image sensing apparatus according to claim 17, wherein said third control means has a mode for inhibiting said second control means from controlling said gains when the outputs of said detection means is out of a predetermined range.

20. An image sensing apparatus according to claim 17, wherein said third control means has a mode for inhibiting said first control means from controlling said gains when a control by said first control means is out of a predetermined range.

21. An image sensing apparatus according to claim 17, wherein said third control means has a mode for making said gains of said various color signal components at a predetermined level when said first control means does not control said gains.

22. A color image sensing apparatus according to claim 17, in which said third control means has a mode for selectively operating one of said first and second control means.

23. A color image sensing apparatus according to claim 22, in which said third control means includes a switch member.

24. A color image sensing apparatus according to claim 23, in which said switch member is a manually operable switch member.

25. An image sensing apparatus comprising:
(a) color image sensing means for sensing an optical image to produce an output having various color signal components, each having a respective signal level;
(b) first means responsive to the levels of said various color signal components of the output of said color image sensing means for forming a signal to control gains of said various color signal components;

(c) second means other than said color image sensing means responsive to a color temperature of an object image to be picked up for forming a signal to control said gains of said various signal components; and (d) gain control means responsive to a combined output of the signals formed by said first and said second means for controlling and determining said gains of said various color signal components.

26. A color image sensing apparatus according to claim 25, in which said gain control means is responsive to a selective output of the signals formed by said first and said second means.

27. A color image sensing apparatus according to claim 25, in which said gain control means is responsive to an added output of the signals formed by said first and said second means.

28. A color image sensing apparatus comprising:

(a) color image sensing means for sensing an optical image to produce an output having various color signal components;

(b) first control means responsive to levels of said various color signal components of the output of said color image sensing means for controlling relative levels of said various color signal components;

(c) detecting means for detecting color temperature of an incident light from an object field to generate a signal corresponding to the color temperature;

(d) second control means responsive to the signal representing the color temperature generated by said detecting means for controlling said relative level of said various color signal components; and (e) switching means for selectively operating one of said first and second control means.

29. A color image sensing apparatus according to claim 28, further comprising:

indicating means for indicating that the operation of said first control means is abnormal.

30. A color image sensing apparatus according to claim 28, further comprising:

indicating means for indicating that the operation of said second control means is abnormal.

31. A color image sensing apparatus according to claim 28, in which said switching means includes a manually operable switch member.

* * * * *